United States Patent
Avasol

(10) Patent No.: US 10,075,387 B1
(45) Date of Patent: Sep. 11, 2018

(54) MOBILE SERVER CONNECTION

(71) Applicant: Amazon Technologies, Inc., Seattle, WA (US)

(72) Inventor: Thomas Evald Avasol, Uppsala (SE)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 14/729,398

(22) Filed: Jun. 3, 2015

(51) Int. Cl.
| | |
|---|---|
| *G06F 15/173* | (2006.01) |
| *H04L 12/911* | (2013.01) |
| *H04L 29/06* | (2006.01) |
| *H04L 29/08* | (2006.01) |

(52) U.S. Cl.
CPC .............. *H04L 47/70* (2013.01); *H04L 67/02* (2013.01); *H04L 67/42* (2013.01)

(58) Field of Classification Search
USPC ..................... 709/226, 224, 201, 202, 223
See application file for complete search history.

(56) References Cited

U.S. PATENT DOCUMENTS

| | | | | |
|---|---|---|---|---|
| 7,496,662 B1* | 2/2009 | Roesch | ............. | H04L 63/1433 709/223 |
| 2003/0236890 A1* | 12/2003 | Hurwitz | ................. | H04L 29/06 709/227 |
| 2007/0048773 A1* | 3/2007 | Lee | ....................... | C12Q 1/6818 435/5 |
| 2007/0211734 A1* | 9/2007 | Yang | ................... | H04L 12/2818 370/401 |
| 2010/0070758 A1* | 3/2010 | Low | ....................... | H04W 4/08 713/155 |
| 2014/0237123 A1* | 8/2014 | Dave | ................ | H04W 52/0261 709/227 |
| 2015/0363237 A1* | 12/2015 | Finnie | ................... | G06F 9/5016 718/104 |
| 2016/0169692 A1* | 6/2016 | Gupta | .................. | B60W 10/08 701/521 |

* cited by examiner

*Primary Examiner* — Lan-Dai T Truong
(74) *Attorney, Agent, or Firm* — Baker & Hostetler LLP

(57) ABSTRACT

A mobile server adapted to provide access to services via a wireless network to devices in proximity of the mobile server is disclosed. The mobile server comprises a web server that receives input at a predefined port. The mobile server generates a WiFi network that is used to communicate data between the mobile server and the devices. Devices are provisioned with information to recognize the WiFi network and communicate requests for functionality to the web server at the predefined port. The mobile server provides access to the requested functionality via the WiFi network. The mobile server may automatically assign particular devices to perform particular functions based upon the operating characteristics of the devices.

19 Claims, 9 Drawing Sheets

MOBILE SERVER CONNECTION

BACKGROUND

The typical person interfaces with several different computing devices during the course of a normal day. For example, many adults have at least one smart phone that they carry with them. Many of those same individuals will also use a tablet device, a laptop computer, and/or a desktop computing system during the course of a day. Each of these devices is typically a self-contained system that includes all subsystems needed for operation including input systems such as keyboards and touch screens, user output systems such as display devices, and networking systems such as network interface cards.

BRIEF DESCRIPTION OF DRAWINGS

The following description of the illustrative embodiments may be better understood when read in conjunction with the appended drawings. It is understood that potential embodiments of the disclosed systems and methods are not limited to those depicted.

DETAILED DESCRIPTION

Figure 1:
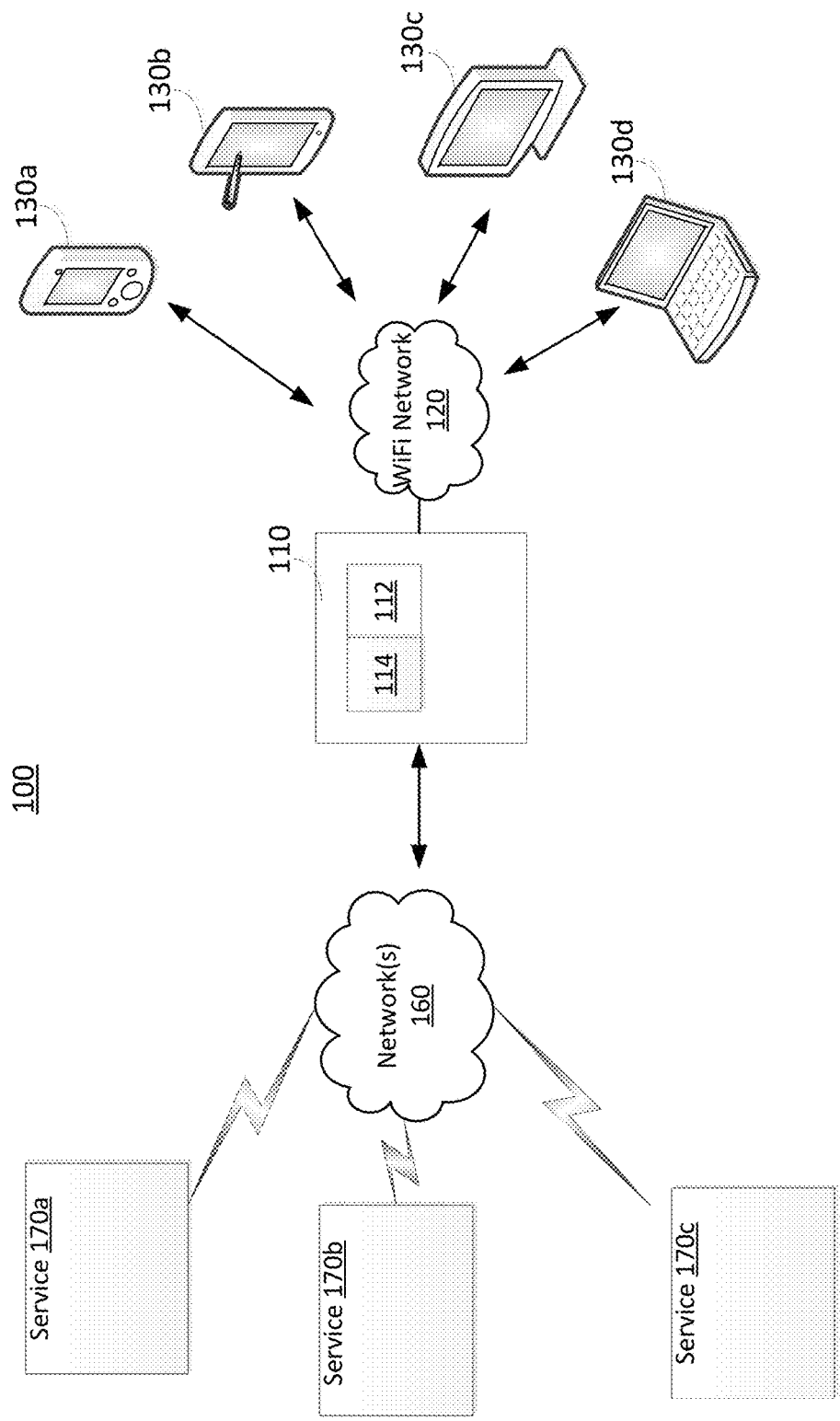
FIG. 1 depicts an example operating environment.

Applicant has noted that many of the computing devices that a person typically employs during the course of the day contain redundant subsystems. For example, each of a user's smart phone, tablet, and laptop have a wireless communication subsystem for communicating with third party networks such as wireless local area networks (WLANs) and cellular 3GPP networks. As between a user's smart phone, tablet, and laptop, the wireless communication subsystems may be considered redundant. By way of further example, both a user's smart phone and tablet computing device may comprise a global positioning system (GPS) and camera. Accordingly, as between the user's smart phone and tablet, the GPS and/or camera components may be viewed as redundant.

Applicant discloses herein a mobile server that comprises various components and functionality that are accessible to devices within the vicinity of the mobile server via wireless connectivity provided by the mobile server. Devices may access the mobile server in order to access functionality such as, for example, a global positioning unit, a camera, and/or connectivity to an external network such as a WLAN or cell network. It will be appreciated that devices may access the mobile server in order to perform functions that otherwise the devices themselves may have needed to perform.

In an example embodiment, the mobile server may have a relatively small form factor such that the mobile server may be carried by a person. For example, the mobile server may fit in a person's pocket or be clipped to a person's belt. Accordingly, the mobile server may be carried on or with a person during the course of the day and thereby be accessible as needed to provide access to the components and functionality included thereon.

In an example embodiment, the mobile server comprises a web server that is accessible at a predetermined or defined port on the mobile server and that provides access to the various components and functionality comprised on the mobile server. For example, the web server may provide connectivity to external networks such as wireless local area networks and/or cellular networks, may provide access to functionality provided by component systems (e.g., GPS, camera) of the mobile server, and/or provide access to data stored on the mobile server.

In an example embodiment, the mobile server may further provide a wireless network which devices in proximity of the mobile server may use to communicate with the web server. For example, in an example scenario, a tablet device may use the wireless network provided by the mobile server to access the web server. The tablet may communicate with the mobile server to, for example, connect with a cellular network connection maintained by the mobile server.

According to another aspect of the disclosed embodiments, the mobile server may generate and transmit output to devices that are registered with the mobile server. Devices such as, for example, smart phones, tablets, laptops, and generic display devices may register with the mobile server by routing a registration request across the wireless network maintained by the mobile server to the web server executing at a predetermined or defined port on the mobile server. The request may specify parameters for communicating with the device. In an example embodiment, the request and parameters may specify, for example, an IP (Internet Protocol) address for the particular device along with parameters for displaying information on the device, for replaying audio on the device, and/or for receiving input from the device. For example, the information may specify the size of the display area, the resolution of the display, the number and types of speakers, the types and numbers of input devices, as well as any other relevant information. The parameter information is stored by the mobile server for use when communicating with the device.

Once a device is registered, and the device has communicated to the mobile server that it is available to receive output from the mobile server, the mobile server may communicate data to and from the registered device. The mobile server formats the data for the particular device using parameters specified during registration and transmits the formatted data to the IP address specified during registration. Where more than one registered device has indicated that it is available to receive output, the mobile server may simultaneously communicate using data formatted for each of the registered device.

According to another aspect of the disclosed embodiments, the mobile server may automatically assign particular devices to perform particular functions based upon the operating characteristics of the devices. In other words, the mobile server may be thought of as brokering functionality across devices. The mobile server may receive profile information that comprises rules defining the circumstances under which the devices may perform particular functions. For example, a profile for a particular device may indicate that the device should continue to provide a particular function, e.g., collect GPS data, until the remaining battery power of the device reaches a particular level. The mobile server uses the profile information in order to select particular devices to perform particular functions under the current operating conditions at the devices. For example, the mobile server may determine that based upon the changed conditions at a device currently providing GPS data, the collection of the GPS data should be performed at another device or on the mobile server itself. As conditions change on the devices, the mobile server may instruct the devices to change the functionality provided by the devices.

Example Processing Environment

FIG. 1 illustrates an example computing environment 100 in which a mobile server 110 may operate. Generally, devices 130a-d communicate with mobile server 110 via wireless network 120, which is provided by mobile server 110, in order to access functionality provided by mobile server 110. For example, device 130a may communicate with mobile server 110 via wireless network 120 in order to access mobile server's connection to external network 160, which may be, for example a third party WLAN and/or cellular network.

In an example embodiment, mobile server 110 is a computing system with a small form factor but which runs a sophisticated operating system such as, for example, Android, Windows, Unix, or Linux. In an example embodiment, mobile server 110 comprises various component systems and/or functionality 114. Components 114 may be any that are suitable for inclusion on mobile server 110 in order to provide features and functionality to devices 130a-d. For example, components 114 may comprise computing memory, a GPS receiver, a motion detector, a compass, a camera, a wireless communication processor, a Bluetooth chip, or any other suitable component system. Devices 130a-d may access mobile server 110 in order to, for example, access one or more of the functions or features provided by the components 114.

In an example embodiment, mobile server 110 comprises a web server 112 that is accessible at a designated port on mobile server 110. The web server 112 operates as an interface to devices 130a-d that access functionality provided by mobile server 110. In an example scenario, devices 130a-d may have been previously provisioned with information identifying the dedicated port and information designating to communicate with web server 112 at the port. Requests from devices 130a-d to access functionality are received at web server 112 which interacts with devices 130a-d to identify a particular function or feature of mobile server 110 that is being requested. In an example scenario, upon receipt of a request, the web server 112 may generate data providing a listing of features or functions that may be accessed and communicate that data for display on the particular requesting device 130a. For example, the listing of features may specify that mobile server 110 may be used to access an external communication connection, store or retrieve data from memory, access GPS functionality, access camera functionality, and/or similar functionality that may be provided by mobile server 110. In a particular example, mobile server 110 may provide a feature set comprising discrete functions such as, for example, store a file, retrieve a file, execute software, stream video, and obtain GPS coordinates. The particular requesting device 130a generates and transmits a reply that includes a selection of the feature or function. In response, web server 112 initiates the requested feature or functionality. For example, where the request was to access a connection to an external network 160, web server 112 initiates processing to provide that connection.

In an example embodiment, web server 112 is programmed to receive and process requests using the HTTP protocol and related technologies such as JSON. It will be appreciated that web server 112 may be implemented with any technologies provided web server 112 operates consistent with the disclosure herein.

As shown in FIG. 1, devices 130a-d access mobile server 110 via wireless network 120 which is generated by mobile server 110. Mobile server 110 may implement wireless network 120 using any wireless networking technology suitable for communication between mobile server 110 and devices 130a-d. For example, the mobile server 110 may support wireless communication via WiFi, Bluetooth, and/or other Near Field Communication (NFC) technology. In an example scenario, wireless network 120 may be an ad hoc mesh network. In an example scenario, wireless network 120 comprises a WLAN implemented using WiFi. Mobile server 110 may implement the WLAN using a hidden service set identifier (SSID) so as to limit access from systems other than devices 130a-d, which may be provisioned with the hidden SSID. Devices 130a-d may be programmed to use the hidden SSID to identify instances where network 120 (and mobile server 110) is in proximity to devices 130a-d. Devices 130a-d may then connect to mobile server 110 via network 120 to access web server 112 and the services or functionality available on mobile server 110. Mobile server 110 comprise any hardware and/or software needed to generate and maintain network 120 including, for example, any specialized processor(s), antenna(s), and any corresponding software such as drivers and interfaces. For example, mobile server 110 may comprise one or more wireless cards and driving software.

In an example embodiment, one of the services or functions provided by mobile server 110 is to connect devices 130a-d with access to external network 160. External network 160 may be any that is suitable for communication of data to and from mobile server 110. For example, network 160 may be a WiFi network such as a wireless local area network, a cellular network such as a 3GPP LTE network, or any other network that may be suitable. Mobile server 110 may be configured to switch between different networks depending upon network availability and/or signal strength. Mobile server 110 comprises hardware and/or software need for communication with network 160 including, for example, specialized processor(s), antenna(s), and any corresponding software such as drivers and interfaces. For example, mobile server 110 may comprise one or more wireless cards and driving software for communicating with external network 160.

Devices 130a-d may communicate with mobile server 110 via network 120 to access network 160. In an example scenario, devices 130a-d may access mobile server 110 via network 120 in order to gain access to a cellular network 160. With an established communication path via mobile server 110 to network 160, devices 130a-d may access any services 170a-c that may be available via network 160. For example, services 170a-c may be Web sites or applications that are accessible via the Internet. In an example scenario, one or more of services 170a-c may be an Amazon Web service such as one that is adapted for storing, processing, and/or retrieving data.

It will be appreciated that in some scenarios, mobile server 110 may access services 170a-c in order to provide functionality and/or data in response to requests from devices 130a-d. For example, where a request is received for a function performed primarily on mobile server 110, mobile server 110 may need to access service 170a to access data or processing capabilities in order to respond to the request.

According to another aspect of the disclosed embodiments, the mobile server 110 may generate and transmit output to devices 130a-d and receive inputs from devices 130a-d while performing the functional processing on mobile server 110. In such a scenario, devices 130a-d may operate substantially as input/output devices with the majority of processing being performed by server 110. In an example embodiment, when a device 130a-d initially contacts mobile server 110, the device undergoes a registration procedure. For example, devices such as smart phones, tablets, laptops, televisions, and generic display devices may register with mobile server 110 by routing a registration request across wireless network 120 to web server 112. The request may specify parameters for communicating with the device. In an example embodiment, the request and parameters may specify, for example, an IP (Internet Protocol) address for the particular device along with parameters for displaying information on the device, playing audio on the device, and receiving inputs from the device. In an example scenario, the information may specify the size of the display area and the resolution of the display area for the particular device 130a-d. By way of further example, the information may specify the type and number of audio speakers of the particular device. Still further, the information may specify the type and number of input sources of the particular device. The parameters may specify the formatting of input data that may be communicated by the particular device. The parameter information is stored by mobile server 110 for use when communicating with the particular device.

Mobile server 110 may communicate output to devices 130a-d and receive input from devices 130a-d once the devices have become registered. In an example scenario, a device that has previously registered with mobile server 110 may communicate to mobile server 110 via network 120 that the particular device is in a state that it may receive display output from mobile server 110. For example, device 130c may sense network 120 indicating mobile server 110 is in the vicinity and, in response, communicate to mobile server 110 that device 130c is in a state that it could receive display output from mobile server 110. In an alternative scenario, device 130c may have been previously registered with mobile server 110 and in response to a user activating device 130c by, for example, activating a button on the device, device 130c may communicate to mobile server 110 that it is in a state to receive display output from mobile server 110. In still another scenario, device 130c may comprise a motion detector which when activated by a user picking up the device, causes device 130c to communicate to mobile server 110 that device 130c is available to receive output from mobile server 110.

Once a device is registered and the device communicates to mobile server 110 that it is available to communicate with the mobile server, mobile server 110 may communicate data for output (display and audio) on the registered device. Mobile server 110 formats the data for the particular device using parameters specified and stored during registration. For example, mobile server 110 may format data for display on device 130c based upon information provided by device 130c during registration. Similarly, mobile server 110 may format data for display on device 130a based upon information provided by device 130a during registration. It will be appreciated that the displays of devices 130a and 130c may be different and therefore the formatting of data for display and playback for the devices may be different. For example, device 130a may have a smaller display area that is not high resolution. Device 130c, on the other hand, may have a large display area that is very high resolution. Mobile server 110 may format output data differently depending upon the particular device. It will be appreciated that where more than one registered device has indicated that it is available to receive output, the mobile server may simultaneously communicate using the private WLAN data formatted for each of the registered device. For example, mobile server 110 may simultaneously format and transmit output data to both display 130a and 130c. The video and audio data is formatted so as to be compatible with the different interfaces.

Mobile server 110 receives inputs from devices 130a-c using analogous processing. Inputs are received by mobile server 110 and processed using the parameters that were defined for the particular device during registration.

It will be appreciated that devices 130a-c may be any that is suitable for interfacing with mobile server 110. For example, devices 130a-c may be a smart phone, smart watch, tablet device, laptop computer, desktop computer, and/or television. It will be appreciated that a suitable device may alternatively be a system that is primarily used as a display and which receives data for display from external sources such as, for example, mobile server 110. In such a scenario, the device may have relatively reduced processing capacity and functionality physically included with the device, and may rely upon other systems such as mobile server 110 to provide access to functionality. In such an embodiment, there is little or no redundancy in functionality between the mobile server and the display device.

Figure 2:
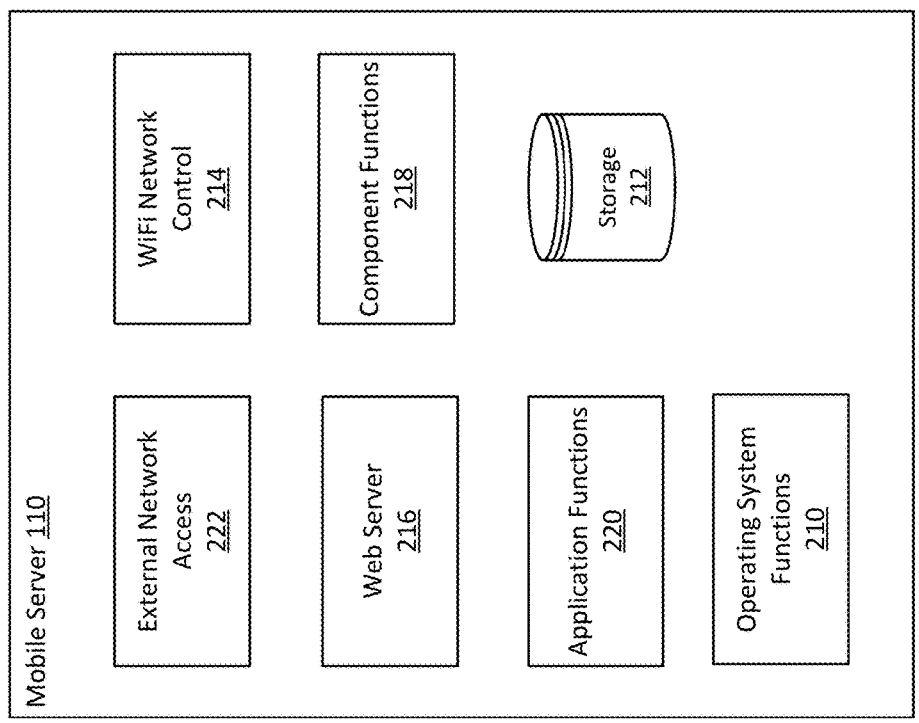
FIG. 2 depicts example functional components of an example mobile server.

FIG. 2 is a diagram illustrating functional components in an example embodiment of mobile server 110. As shown, in an example embodiment, mobile server 110 comprises operating system functionality 210 which involves performing functions that are typically associated with operating a computing system such as, for example, controlling subsystems. Mobile server 110 also comprises functionality for providing data storage and retrieval 212. Data storage and retrieval functionality 212 may be used, for example, when storing and retrieving data such as parameters for devices 130a-d.

Mobile server 110 comprises WiFi access network control functionality 214. As noted above, mobile server controls the generation and maintenance of WiFi network 120 which is used by devices 130a-d to access mobile server 110.

Mobile server 110 further comprises web server functionality 216. Web server functionality 216 involves creating and maintaining web server 112 and maintaining interfaces between web server 112 and the remaining functionality on mobile server 110. Web server functionality 216 provides an interface by which devices 130a-d may communicate with mobile server 110.

Mobile server 110 further comprises component functionality 218 which corresponds to interfacing with various component systems such as, for example, GPS systems, camera systems, phone systems, and any other component systems that may be comprised in mobile server 110. Application functionality 220 corresponds to any applications that may be used on mobile server 110 to support functionality as described herein. Application functionality 220 further corresponds to any user installed applications. In an example embodiment, application functionality 220 may correspond to functionality provided by a third party service 170. The functionality may be pre-configured to call a particular third party service accessible via the network connection in order to perform a particular functionality. In an example scenario, the pre-configured service may be a service that provides data storage, data processing, etc.

Mobile server 110 still further comprises external network access functionality 222. Mobile server 110 performs operations to drive any networking hardware needed to interface with external network 160 and to allow for communication over network 160.

Example Processing of Mobile Server Access Requests

Figure 3:
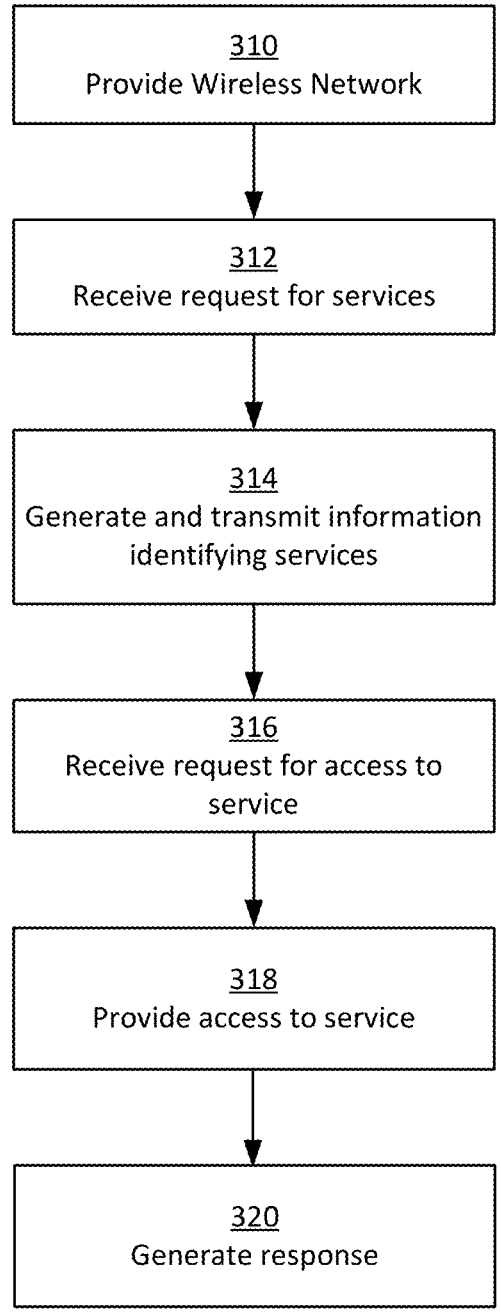
FIG. 3 depicts a flow diagram of an example process for accessing services on an example mobile server.

FIG. 3 is a diagram depicting example processing performed by mobile server 110 in receiving and responding to requests. As shown, at block 310 mobile server 110 provides a wireless network 120. In an example embodiment, mobile server 110 may be provisioned with a wireless network card. At block 310, the software that controls the operation of the wireless network card may activate the wireless network card and configure the card to establish a WiFi network with a particular SSID. In an example embodiment, the wireless network card may be provisioned not to advertise the SSID so that it remains "hidden" and not easily discernable by other devices. In an example embodiment, devices 130a-d likewise have wireless network cards and may have been previously provisioned to search for and detect the defined SSID of the network generated by mobile server 110. It will be appreciated that the SSID used by mobile server 110 may likewise be used by other instances of mobile server 110. Multiple mobile servers may generate a wireless network with the same SSID. Devices 130a-d are programmed to recognize mobile servers whenever the particular SSID is identified by the devices. Any suitable technology may be used to avoid interference between devices communicating with particular mobile servers. For example, an anonymous peer to peer networking protocol that addresses clashing of IP addresses may be used.

At block 312, mobile server 110 receives a request for services from one of devices 130a-d. In an example scenario, a request may be received from device 130a which may have been provisioned to direct requests to web server 112 at a predefined port on mobile server 110. Accordingly, the request may be received at web server 112 via the predefined port. The request may be received using HTTP.

At block 314, web server 112 generates and transmits information identifying functionality or services that are available via mobile server 110. In an example embodiment, computing storage 212 may have stored therein information specifying the various services that are available via the particular mobile server 110. For example, computing storage 212 may have stored in memory information identifying the following services: store file; retrieve file; execute software; stream video; and retrieve GPS coordinates. In an example embodiment, web server 112 may search computing memory 212 for information identifying services available at the mobile server 110. In an example scenario, the search may return data indicating, for example, that mobile server 110 may be used to access an external communication connection, store or retrieve data from memory, access GPS functionality, access phone functionality, stream video, retrieve still images, and/or other suitable functionality. In an example scenario, the search may return data indicating that mobile server may provide access to one or more pre-configured services offered via the Internet or Web and accessible via the mobile server's network connectivity. Web server 112 formats the retrieved data for communication to the requesting device 130a. In an example scenario, web server 112 may format the data for display as an HTML formatted Web page. The formatted data is transmitted by the web server via network 120 to requesting device 130a. The formatted data may be transmitted using an HTTP command.

Requesting device 130a may present the received data for selection of one of the services by the operation of device 130a. In an example scenario, device 130a may display a Web page corresponding to a received HTML file. The displayed web page may list various functions and services that are available at mobile server 110. In an example scenario, mobile server 110 may list services including: storing a file; retrieving a file; executing software; streaming video; and retrieving GPS coordinates. In an example scenario, the mobile server may list data indicating that mobile server may provide access to one or more pre-configured services offered via the Internet or Web and accessible via the mobile server's network connectivity. An operator of device 130a may select one of the functions or services, which causes a second request to be generated and forwarded over network 120 to web server 112. In an example scenario, the request may be to access an external communication connection provided by mobile server 110. The request may be formatted, for example, as an HTTP request. In an alternate example scenario, the request may be to store a file.

At block 316, web server 112 may receive at the predetermined port the request from requesting device 130a. Web server 112 processes the request in order to identify the particular function that was requested. In an example scenario, web server 112 queries computing storage 212 in order to identify the particular functionality or service that is to be executed in response to the request. In an example embodiment, computing storage 212 has stored in relation to each function or service, information indicating the processing that is to be performed for the requested function or service. For example, computing storage 212 may have stored therein information indicating that when a user requests to store a file, mobile server 110 is to store the requested file at a particular location in local storage. In an example scenario, the stored data may indicate to perform multiple processing actions in response to a requested function or service. For example, the stored data may indicate that for a request to store a file, mobile server 110 is to store the designated file in a particular location in local storage and request that the file be stored using one or more cloud or web services such as Amazon S3 Web service, Dropbox, etc. For instances wherein web services correspond to requested features or functions, local client software may be stored in memory which may be executed by mobile server 110 as needed.

It will be appreciated that the data stored by mobile server 110 reflects a particular functional configuration for the particular mobile server. Typically, there is a default setting that applies. For example, for the service of storing a file, the default setting may be to store designated files at a particular location locally to the mobile server 110. The configuration of the mobile server may be changed by modifying the functions or features as reflected in the stored data. For example, mobile server 110 may be customized by At block 318, web server 112 provides the requested functionality or service. In an example scenario wherein the request was for access to external network 160, web server 110 initiates providing a communication path between device 130a and network 160 via mobile server 110. In a scenario wherein the request was to retrieve a current GPS reading, web server 112 may initiate processing to access the GPS functionality and, in particular, processing to obtain a location reading. In an example scenario where the request was to store a file, web server 112 may store the file locally, but may also store the file in a cloud or web service consistent with a pre-configured data specifying the actions to be taken with respect to the cloud or web service.

At block 320, web server 112 generates and transmits a response to the request to the particular device. In an example scenario, the generated response may comprise a result from a service or functionality requested by the device and implemented by mobile server 110. In another scenario, the response may provide or request further information relating to providing the requested service or function. For example, where device 130*a* had requested access to network 160, the response may provide information for accessing the communication channel to network 160 via mobile server 110. The response may be communicated, for example, using the HTTP protocol.

As illustrated by the above discussion, services and functionality provided by mobile server 110 may be accessed by devices 130*a-d*. Accordingly, mobile server 110 may be viewed as providing a personal cloud of services accessible to devices in proximity to mobile server 110. As a consequence of having access to the services and functionality provided by mobile server 110, devices 130*a-d* may not themselves need to comprise the same set of features and functionality.

Example Processing for Distributing Output Data

Figure 4:
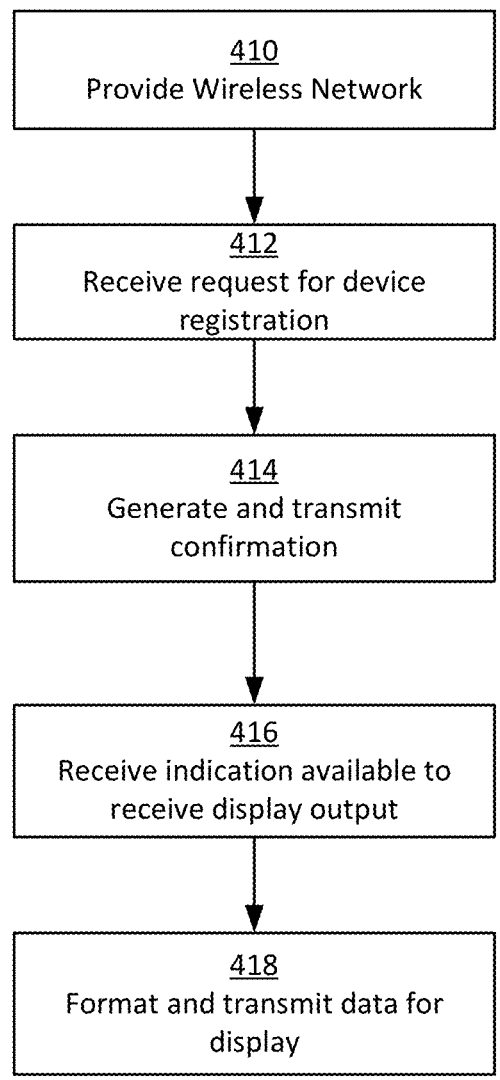
FIG. 4 depicts a flow diagram of an example process for communicating output between an example mobile server and example device.

FIG. 4 is a diagram depicting example processing performed by mobile server 110 in distributing output data, and in particular, display data, to devices 130*a-d*. As shown, at block 410 mobile server 110 provides a wireless network 120. As described above in connection with FIG. 3, mobile server 110 may be provisioned with a wireless network card. At block 410, the software that controls the operation of the wireless network card may activate the wireless network card and configure the card in order to establish a WiFi network with a particular SSID. Devices 130*a-d* likewise have wireless network cards and may have been previously provisioned to search for and detect the particular SSID of the network generated by mobile server 110.

At block 412, mobile server 110 receives a request from one of devices 130*a-d* to register with mobile server. In an example embodiment, the request is received at web server 112 which listens on the predefined port. In an example scenario, device 130*c* may be initially contacting mobile server 110. Accordingly, device 130*a* may need to register with mobile server 110 so that mobile server 110 may collect and store information about device 130*a* and the process for communicating with device 130*c*. The request may specify parameters for communicating with device 130*c*. In an example embodiment, the request and parameters may specify, for example, an IP (Internet Protocol) address for the particular device along with parameters for displaying information on the device, replaying audio on the device, and receiving inputs from the device. For example, the information may specify the size of the display area and the resolution of the display area for the particular device 130*c*. The information may specify the number and types of speakers and the format of data that may be processed by the speakers. The information may further specify the types and number of input devices and the format of inputs generated by the devices. The parameter information is stored by mobile server 110 for use when communicating with device 130*c*.

It will be appreciated that when devices 130*a-d* register with mobile server 110, the devices may undergo an authentication process with mobile server 110 so that mobile server can be sure the device is one that is authorized to interface with mobile server 110. Any suitable authentication processing may be used.

At block 414, mobile server 110 generates and transmits a confirmation of the registration to the device from which the registration request was received. In an example scenario where the request was received from the device 130*c*, web server 112 communicates a confirmation response via wireless network 120.

At block 416, mobile server 110 receives via web server 112 an indication from a device that the device is available to display output data from mobile server 110. A device that has previously registered with mobile server 110 may communicate to mobile server 110 via network 120 that the particular device is in a state that it may receive display output from mobile server 110. In an example scenario, device 130*c* may sense network 120 indicating mobile server 110 is in the vicinity and, in response, communicate to mobile server 110 that device 130*c* is in a state that it could receive display output from mobile server 110. In an alternative scenario, in response to a user activating device 130 by, for example, activating a button on device 130*c*, device 130*c* may communicate to mobile server 110 that it is in a state to receive display output from mobile server 110. In yet another scenario, device 130*c* may have a motion detector, and upon sensing motion which may indicate a person has picked up the device, device 130*c* communicates to mobile server 110 that it is in a state to receive output from mobile server 110.

At block 418, mobile server 110 formats and transmits data for output on the registered devices that have been identified as available for receiving display output. In an example scenario, mobile server 110 formats and transmits display data for display on the registered devices. Mobile server 110 formats the data for the identified device using parameters specified and stored during registration. For example, mobile server 110 may format data for display on device 130*c* based upon information provided by device 130*c* during registration. Similarly, mobile server 110 may format data for display on device 130*a* based upon information provided by device 130*a* during registration. In an alternative scenario, mobile server 110 may format data for audio play on the devices 130*a, c*.

It will be appreciated that the displays of devices 130*a* and 130*c* are different and therefore the formatting of display out for the devices may be different. For example, device 130*a* may have a smaller display area that is not high resolution. Device 130*c*, on the other hand, may have a large display area that is very high resolution. Mobile server 110 may format output data differently depending upon the particular device. In the scenario wherein the output data is audio data, the data may similarly be formatted differently depending upon the parameters specified for the particular device 130*a,c*.

It will be appreciated that where more than one registered device has indicated that it is available to receive output, the mobile server may simultaneously communicate using the private WLAN data formatted for each of the registered device. For example, mobile server 110 may simultaneously format and transmit output data to both display 130*a* and 130*c*. Mobile server 110 may use network address translation (NAT) in passing data to multiple devices. Accordingly, the output may be simultaneously be viewed on several devices 130*a* and 130*c*. A user may subsequently select one of the devices that is preferred for the particular content. For example, where the content is a high resolution video, once the content has begun to be displayed, the user may select device 130*c* which is larger and a better interface for the particular video. Device 130*c* may communicate to mobile server 110 that device 130*c* is preferred, at which time mobile server 110 may discontinue outputting data to device 130*a*.

It will be appreciated that once a device 130 has registered with mobile server 110 and indicated that it is available to receive output, mobile server 110 may initiate forwarding of data to the devices that have indicated they are available. For example, in an embodiment wherein mobile server 110 has connectivity to a cellular network 160 and processing capability to receive phone calls, upon receipt of a call, mobile server 110 may begin streaming information about receipt of the call to all devices 130 that have indicated they are available. The user of the devices 130 may then select which device they wish to receive the call on, which causes the particular device to communicate the selection to mobile server 110. Mobile server 110 discontinues forwarding the data regarding the call to other than the selected device.

Example Processing for Brokering of Functions Between Devices

Figure 5:
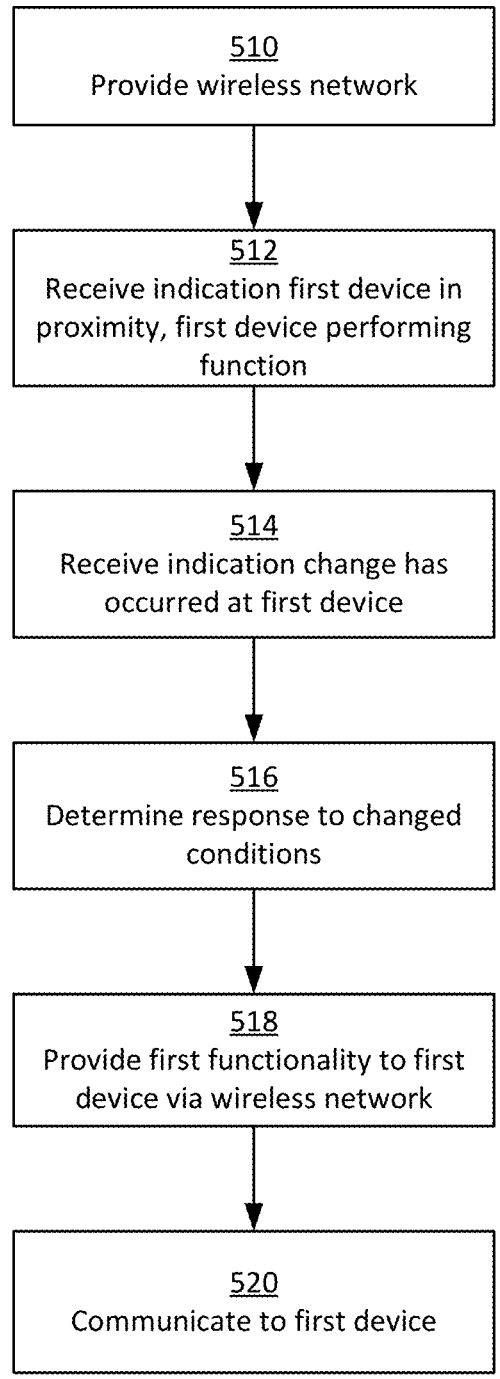
FIG. 5 depicts a flow diagram of an example process for automatically coordinating performance of functions on a device.

FIG. 5 is a diagram depicting example processing performed by mobile server 110 in brokering or coordinating functionality between devices 130*a-d*. Each of devices 130*a-d* comprises a set of functionality that the devices themselves are programmed to perform. In an example embodiment, device 130*a* may comprise hardware and software programming that allows device 130*a* to, for example, store data, access a wireless network, collect GPS coordinates, display data, etc. Device 130*b* may similarly have hardware and software programming that allows device 130*b* to provide the same set of functionality. Mobile server 110 likewise may comprise hardware and be programmed with software to perform functions such as, for example, storing data, providing access to a wireless network, and collecting GPS coordinates.

In an example embodiment, mobile server 110 further has stored thereon profile information for each of the devices 130 which may have been provided, for example, during the device registration process. The profile information may specify, for example, the conditions under which particular functionality should be provided by the particular device. In an example scenario, the profile information may specify the particular functions that the particular device may provide itself under various operating conditions. For example, the profile information received for device 130*a* may specify that the device may provide a particular function, e.g., access to a wireless network, under particular operating conditions such as, for example, remaining power level, quality of service provided by the network connection, or any other suitable metric. The profile information may further specify the conditions under which particular functionality may be provided for the device by the mobile sever 110 as opposed to the particular device. For example, the profile information may specify that when the power level is below a threshold, collection of GPS coordinates may be performed by mobile server 110 and forwarded to the particular device. Similarly, the profile information may specify that when the quality of service provided by wireless connection of the particular device is below a desired threshold or level, the wireless connectivity provided by mobile server 110 may be used. In some instances, the information may specify priority that should be given to a particular device in providing a particular function relative to other devices. For example, the profile of a particular device may indicate that with respect to the function of collecting GPS coordinates, the particular device should have priority over other devices owned by the same person. The particular device should be used to collect GPS data until its battery level reaches a determined level. The combination of profiles from the various devices 130*a-d* create a rule base that mobile server 110 may use in determining which functionality may be provided by the devices or mobile server 110 under particular conditions.

Referring to FIG. 5, at block 510, mobile server 110 provides a wireless network as described above in connection with FIGS. 1-3.

At block 512, mobile server 110 receives an indication from a first device that the device is in proximity to the mobile server 110. The device may also provide operating characteristics of the particular device including, for example, the particular functions that the particular device is itself performing and information regarding operating characteristics. In an example embodiment, device 130*a* may specify that it is currently collecting GPS coordinates, using its own connectivity to a wireless network, and/or storing data locally. In the example embodiment, device 130*a* may further specify the current operating conditions such as current battery reserves, wireless connectivity quality or bandwidth, existing available memory, etc.

At block 514, mobile server 110 receives an indication via the wireless network that change in conditions has occurred at the first device. The change may be with respect to any characteristic or metric relating to the particular device including computing resources. For example, mobile server 110 may receive information indicating that the connection provided by the wireless connectivity of the particular device may have degraded and be below a particular threshold. In another example, mobile server 110 may receive information indicating the available computing storage has reached a particular level which may be less than a desired threshold. In yet another example, mobile server 110 may receive information indicating the available battery power may be at or below a particular value.

At block 516, mobile server 110 determines what changes in the distribution of functionality ought to be made based upon the changed conditions at the device. In an example embodiment, mobile server 110 queries the rules or logic compiled from the profile information that corresponds to the particular device. In a particular example, mobile server 110 may query the profile conditions under which functionality currently being provided by the device 130 may be switched or provided, instead, by mobile server 110. In an example embodiment, mobile server 110 queries rules or logic data to identify that GPS functionality that is currently being provided by device 130*a*, may be switched to being collected by mobile server 110 when the battery power of device 130*a* is below a particular threshold. In another example, mobile server 110 may query rules or logic data to identify that access to a wireless network that is currently being provided by device 130*a*, may be switched to being provided by mobile server 110 when the quality of the service at device 130*a* is below a particular level.

At block 518, mobile server 110 provides the functionality to the particular device via the wireless network. In the example scenario where the functionality is collecting GPS coordinates, mobile server 110 begins collecting the coordinates. In the example scenario wherein the functionality is providing access to a wireless network, mobile server 110 coordinates creation of the connection. In some instances, the functionality may be that which is provided by a service 170 as discussed above, in which case, mobile server 170 launches the appropriate software for initiation of the service.

At block 520, mobile server 110 communicates to the particular device that it has begun providing the functionality and forwards any relevant information relating to the particular service. As part of the communication, mobile server 110 may communicate to the particular device to cease providing the functionality itself.

It will be appreciated that the above processing may continue and functionality switch between the particular device and mobile server 110. In an example scenario, mobile server 110 may again receive an indication that there has been a change in the operating conditions at a device 130. In response, mobile server 110 may terminate providing functionality via the wireless network and transmit an indication to the device to begin providing access to the functionality internally. In an example scenario, where mobile server 110 had previously assumed responsibility for collecting GPS coordinates from device 130a, and in response to an indication from device 130a that battery power is above a particular threshold, mobile server may terminate collecting GPS coordinates and communicate to device 130a to begin collecting the data itself.

Figure 6:
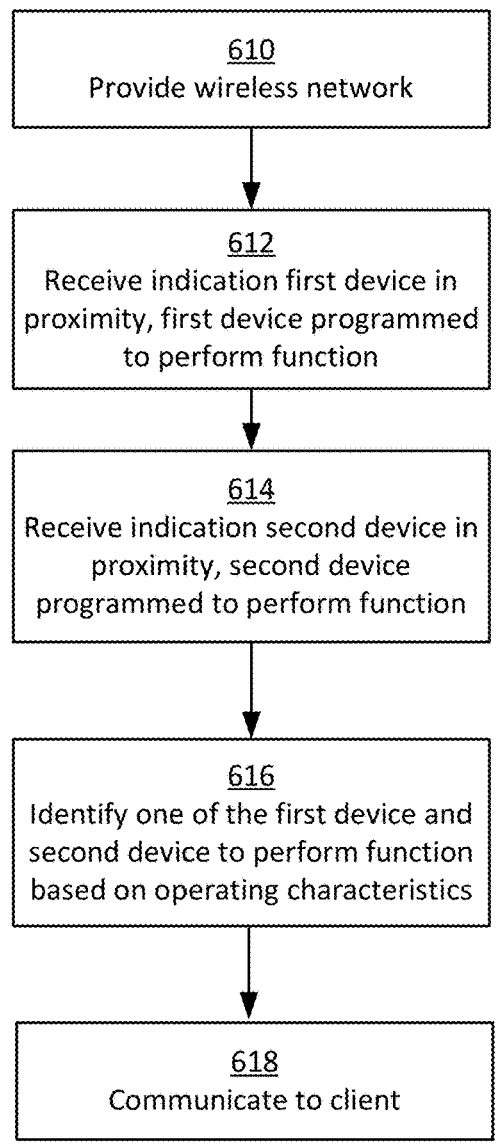
FIG. 6 depicts a flow diagram of an example process for automatically coordinating performance of functions between devices.

In some instance, mobile server 110 may operate to broker functionality between two devices that are connected to mobile server 110. For example, where two of a particular user's devices offer redundant functionality, mobile server 110 may determine as between the two which should provide the functionality at any particular moment. For example, wherein two devices both have connectivity to different wireless networks, respectively, the device with the better signal strength at any particular time ought to be used as between the two. FIG. 6 depicts a flow chart of processing performed by mobile server 110. As shown, at block 610, mobile server 110 provides a wireless network as described above in connection with FIGS. 1-3.

At block 612, mobile server 110 receives an indication that a first device is in proximity to the mobile server 110. Also received is operating characteristic information specifying any suitable information relating to the operation of the particular device. The information may comprise metrics and/or status information reflecting operation of the device. For example, the information, may indicate that the particular device is performing a function such as collecting GPS readings and may further specify conditions such as battery charge level, available memory, quality of service provided, etc.

At block 614, mobile server 110 may receive an indication that a second device is in proximity to the mobile server 110. Also received is operating characteristic information specifying the various functionality provided by the particular device. The information may comprise metrics or status information reflecting operation of the device. For example, the information may indicate that the particular device is performing a function such as storing data and may further specify conditions such as battery charge level, available memory, quality of service provided, etc.

At block 616, mobile server 110 identifies one of the first device and second device to perform functions based on operating characteristics at the two devices. In an example embodiment, mobile server 110 may query the rules or logic compiled from the profile information that corresponds to the two devices that have been identified as being in proximity. For example, mobile server 110 may query the profile data for data indicating the conditions under which functionality should be performed by either of the first or second device. In an example scenario, mobile server 110 may search the rules using the operating characteristics for the two devices in order to identify as between the two devices, which should be performing particular functions. In an example scenario, mobile server 110 may query to identify that as between the two devices 130a and 130b, when the operating characteristics indicate that device 130a should have priority with respect to collecting GPS features, mobile server 110 identifies device 130a for that purpose. In another example scenario, mobile server 110 may query to identify that as between the two devices 130a and 130b, when the operating characteristics indicate the battery level on device 130a is below fifty percent, the GPS collecting functionality and/or wireless access functionality of device 130b should be used. In another example, mobile server 110 may query to identify that as between devices 130a and 130b, when the operating characteristics indicate the quality of service or level of performance of one of devices 130a and 130b in providing a function such as wireless access is below a desired level, the functionality should be transferred to the other of the devices.

At block 618, mobile server 110 communicates messages indicating to perform the relevant functionality. For example, where device 130a was being used for collecting GPS data, mobile server 110 may, based upon the processing at block 616, provide instructions to device 130a to cease collecting GPS data and to device 130b to begin collecting GPS data. In another example scenario where device 130a was being used for providing wireless connectivity, mobile server 110 may, based upon the processing at block 616, provide instructions to device 130a to cease the wireless connectivity and provide instructions to device 130b to begin providing wireless connectivity.

It will be appreciated that in some circumstances, mobile server 110 may determine, upon querying its rules based upon device profiles, that a particular functionality should be provided by the mobile server as opposed to any of the devices that are connected thereto. For example, mobile server 110 may query to identify that when the operating characteristics on both devices 130a and 130b indicate the battery levels are below fifty percent, the GPS collecting functionality and/or wireless access functionality should be provided by mobile server 110.

It will also be appreciated that devices may repeatedly provide updates to mobile server 110 regarding their operating characteristics. The updates may be provided at predetermined intervals and/or whenever the operating characteristics of a device changes. Accordingly, mobile server 110 may receive an indication from both device 130a and 130b that the operating information or characteristics of the device have changed. For example, the changed characteristics may indicate a previously selected device can no longer provide the desired quality of service. In response, mobile server 110 processes the characteristics as described above in connection with block 616. In an example scenario, mobile server 110 may determine that based upon the changed operating characteristics, a different one of two devices should perform a particular function. For example, mobile server 110 may determine that based upon the changed operating characteristics, the device originally selected to provide a function, e.g. wireless access, can no longer provide the desired quality of service. Accordingly, mobile server 110 may determine to have the second device provide the function. In another scenario, mobile server 110 may determine based upon changed operating characteristics that the device originally selected to provide the function can no longer do so, and that a second device cannot provide a desired level of service. Accordingly, mobile server 110 may determine that it will itself perform the function and notify the device currently providing the function to cease performing the function.

Example Services Processing Environment

As noted in connection with FIG. 1, devices 130*a-d* may access various services 170*a-c* via mobile server 110 and its connection to network 160. Services 170*a-c* may be any that are suitable. For example, services may include Web sites, but also may include Web based services for storing, processing, and returning data. Additionally, in some instances mobile server 110 may rely upon one or more services 170*a-c* to perform processing associated with servicing devices 120*a-d*. For example, mobile server 110 may rely upon services 170*a-c* to store data or perform processing associated with the processing described in connection with FIGS. 3, 4, and 5.

Figure 7:
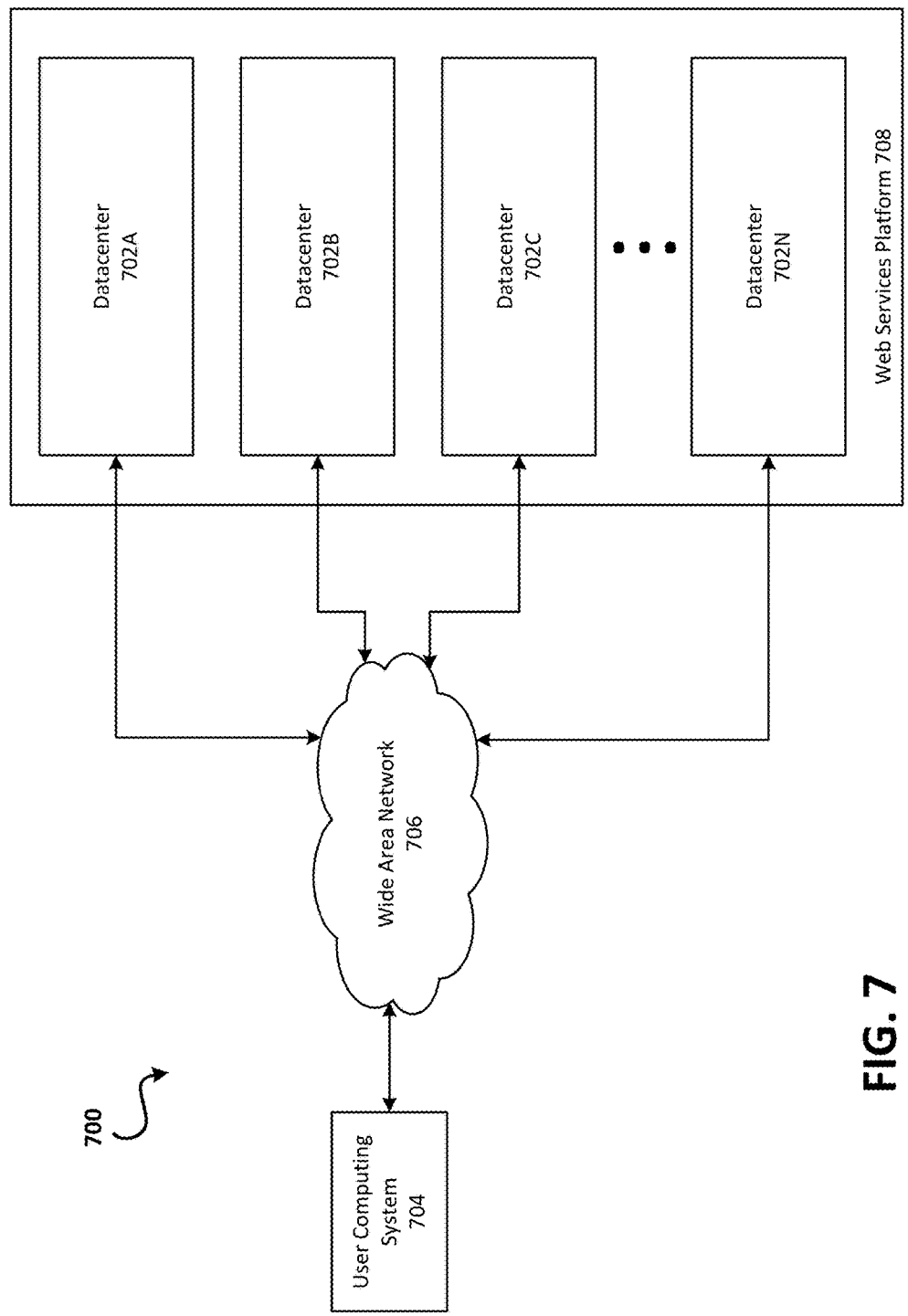
FIG. 7 depicts an example computing arrangement for implementing services accessible to an example mobile server.
Figure 8:
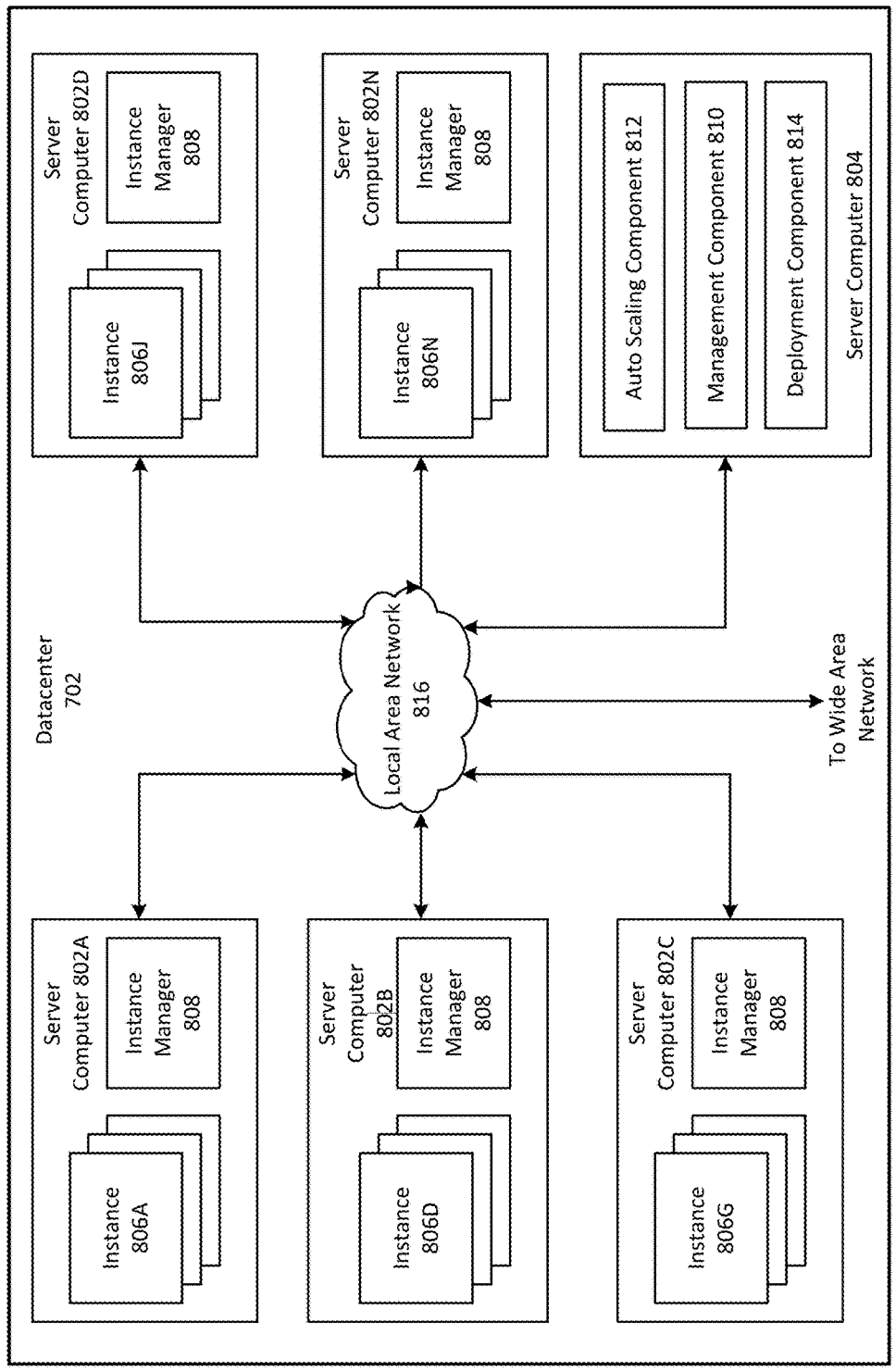
FIG. 8 depicts an example computing arrangement for implementing services accessible to an example mobile server.

FIGS. 7 and 8 depict example operating environments that might be used to provide services 170*a-c*. Generally, FIG. 7 depicts a web services platform that comprises a plurality of datacenters. FIG. 8 depicts a datacenter that comprises a plurality of computers.

Turning to the details of FIG. 7, this figure depicts an example of a suitable computing environment in which embodiments described herein may be implemented. A cloud service provider (such as web services platform 708) may configure the illustrated computing environment to host virtual clouds of entities and to enable communication paths between these virtual clouds that may otherwise be isolated. In particular, FIG. 7 is a system and network diagram that shows an illustrative operating environment 700 that includes a web services platform 708 for implementing virtual clouds and for providing on-demand access to computer resources, such as virtual machine instances. Web services platform 708 can provide computer resources for executing applications on a permanent or an as-needed basis and may be configured as a private network. These computer resources may include various types of resources, such as data processing resources, data storage resources, data communication resources, and the like. Each type of computer resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of computer resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The computer resources provided by web services platform 708 may be enabled by one or more datacenters 702A-702N, which may be referred herein singularly as "datacenter 702" or in the plural as "datacenters 702." Datacenters 702 may be facilities that house and operate computer systems and associated components and may include redundant and backup power, communications, cooling, and security systems. Datacenters 702 may be located in a same geographical area, such as in a same facility, and may be interconnected using private networks, such as high-speed fiber optic networks, controlled and managed by a service provider of web services platform 708. Datacenters 702 may also be distributed across geographically disparate locations and may be interconnected in part using public networks, such as the Internet. One illustrative configuration for datacenter 702 that implements the concepts and technologies disclosed herein is described below with regard to FIG. 7.

Entities of web services platform 708 may access the computer resources provided by datacenters 702 over a Wide Area Network (WAN) 706. Although a WAN is illustrated in FIG. 7, it should be appreciated that a Local Area Network (LAN), the Internet, or any other networking topology known in the art that connects datacenters 702 to remote entities and other users may be utilized. It should also be appreciated that combinations of such networks may also be utilized.

An entity or other entities that are users of web services platform 708 may utilize a computing system 704 to access the computer resources provided by datacenters 702. User computing system 704 comprises a computer capable of accessing web services platform 708, such as a server computer, a desktop or laptop personal computer, a tablet computer, a wireless telephone, a PDA, an e-reader, a game console, a set-top box, or any other computing node. In an example scenario, computing system 704 may correspond, for example, mobile server 110 and/or devices 130*a-d* described above in connection with FIG. 1.

As is described in greater detail below, user computing system 704 may be utilized to configure aspects of the computer resources provided by web services platform 708. In this regard, web services platform 708 may provide a web interface through which aspects of its operation may be configured through the use of a web browser application program executing on user computing system 704. Alternatively, a stand-alone application program executing on user computing system 704 may access an application programming interface (API) exposed by web services platform 708 for performing the configuration operations. Other mechanisms for configuring the operation of web services platform 708, including launching new virtual machine instances on web services platform 708, may also be utilized.

According to embodiments disclosed herein, capacities of purchased computer resources provided by web services platform 708 can be scaled in response to demand. In this regard, scaling refers to the process of instantiating, which may also be referred to herein as "launching" or "creating," or terminating, which may also be referred to herein as "de-scaling," instances of computer resources in response to demand.

Web services platform 708 may also be configured with a deployment component to assist entities in the deployment of new instances of computer resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of computer resources.

FIG. 8 depicts a computing system diagram that illustrates one configuration for datacenter 702 that implements web services platform 708. The example datacenter 702 shown in FIG. 8 may include several server computers 802A-802N, which may be referred herein singularly as "server computer 802" or in the plural as "server computers 802," for providing computer resources for hosting virtual clouds and for executing applications. Server computers 802 may be standard tower or rack-mount server computers configured appropriately for providing the computer resources described above. For instance, in one implementation server computers 802 may be configured to provide instances 806A-806N of computer resources.

Instances 806A-806N, which may be referred herein singularly as "instance 806" or in the plural as "instances 806," may be virtual machine instances. As known in the art, a virtual machine instance is an instance of a software implementation of a machine (i.e., a computer) that executes programs like a physical machine. In the example of virtual machine instances, each server 802 may be configured to execute an instance manager 808 capable of executing the instances. Instance manager 808 may be a hypervisor or another type of program configured to enable the execution of multiple instances 806 on a single server 802, for example. As discussed above, each of instances 806 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources, and with other types of resources. The embodiments disclosed herein may also execute all or a portion of an application directly on a computer system without utilizing virtual machine instances.

Datacenter 702 shown in FIG. 8 may also include a server computer 804 reserved for executing software components for managing the operation of datacenter 702, server computers 802, and instances 806. In particular, server computer 804 may execute a management component 810. As discussed above, working between FIGS. 7 and 7, an entity of web services platform 708 may utilize user computing system 804 to access management component 810 to configure various aspects of the operation of web services platform 708 and instances 806 purchased by the entity. For example, the entity may purchase instances and make changes to the configuration of the instances. The entity may also specify settings regarding how the purchased instances are to be scaled in response to demand. The entity may also provide requests to launch instances to management component 810.

As also described briefly above, an auto scaling component 812 may scale instances 806 based upon rules defined by an entity of web services platform 708. For example, auto scaling component 812 may allow an entity to specify scale up rules for use in determining when new instances should be instantiated and scale down rules for use in determining when existing instances should be terminated.

As discussed briefly above, datacenter 702 may also be configured with a deployment component 814 to assist entities in the deployment of new instances 806 of computer resources. Deployment component 814 may receive a configuration from an entity that includes data describing how new instances 806 should be configured. For example, the configuration may specify one or more applications that should be installed in new instances 806, provide scripts and/or other types of code to be executed for configuring new instances 806, provide cache warming logic specifying how an application cache should be prepared, and other types of information.

Deployment component 814 may utilize the entity-provided configuration and cache warming logic to configure, prime, and launch new instances 806. The configuration, cache warming logic, and other information may be specified by an entity using management component 810 or by providing this information directly to deployment component 814. Other mechanisms may also be utilized to configure the operation of deployment component 814.

In the example datacenter 702 shown in FIG. 8, an appropriate LAN 816 may be utilized to interconnect server computers 802A-802N and server computer 804. LAN 816 may also be connected to WAN 706 illustrated in FIG. 7. It should be appreciated that the network topology illustrated in FIGS. 7 and 8 has been greatly simplified and that many more networks and networking devices may be utilized to interconnect the various computing systems disclosed herein. Appropriate load balancing devices or software modules may also be utilized for balancing a load between each of datacenters 702A-702N, between each of server computers 802A-802N in each datacenter 702 and between instances 806 purchased by each entity of web services platform 708. These network topologies and devices should be apparent to those skilled in the art.

It should be appreciated that datacenter 702 described in FIG. 8 is merely illustrative and that other implementations may be utilized. In particular, functionality described herein as being performed by management component 810, auto scaling component 812, and deployment component 814 may be performed by one another, may be performed by other components, or may be performed by a combination of these or other components. Additionally, it should be appreciated that this functionality may be implemented in software, hardware, or a combination of software and hardware. Other implementations should be apparent to those skilled in the art.

Figure 9:
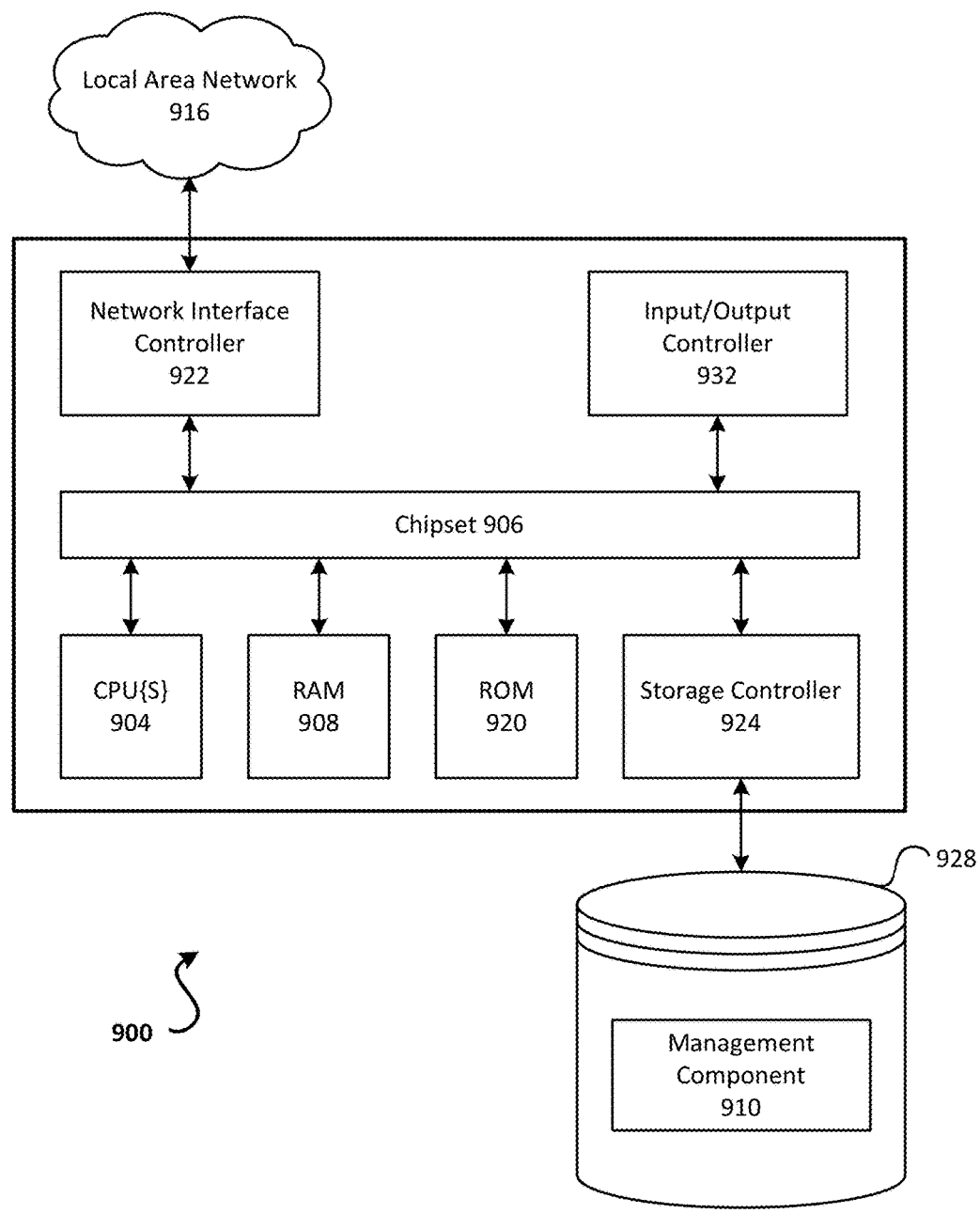
FIG. 9 depicts an example computing system that may be used in some embodiments.

FIG. 9 depicts an example computer architecture for a computing system 900 capable of executing software for performing operations as described above in connection with FIGS. 1-9. For example, computing system 900 may be used to implement mobile server 110 and devices 130a-d of FIG. 1, as well as server computers 802 of FIG. 8. The computer architecture shown in FIG. 9 illustrates a conventional server computer, workstation, desktop computer, laptop, tablet, network appliance, PDA, e-reader, digital cellular phone, or other computing node, and may be utilized to execute any aspects of the software components presented herein described as executing on mobile server 110, on devices 130a-d, within datacenters 702A-702N, on server computers 802A-802N, on the user computing system 704, or on any other computing system mentioned herein.

Computer 900 may include a baseboard, or "motherboard," which is a printed circuit board to which a multitude of components or devices may be connected by way of a system bus or other electrical communication paths. One or more central processing units (CPUs) 904 may operate in conjunction with a chipset 906. CPUs 904 may be standard programmable processors that perform arithmetic and logical operations necessary for the operation of computer 900.

CPUs 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 906 may provide an interface between CPUs 904 and the remainder of the components and devices on the baseboard. Chipset 806 may provide an interface to a random access memory (RAM) 908 used as the main memory in computer 900. Chipset 906 may further provide an interface to a computer-readable storage medium, such as a read-only memory (ROM) 920 or non-volatile RAM (NVRAM) (not shown), for storing basic routines that may help to start up computer 900 and to transfer information between the various components and devices. ROM 920 or NVRAM may also store other software components necessary for the operation of computer 900 in accordance with the embodiments described herein.

Computer 900 may operate in a networked environment using logical connections to remote computing nodes and computer systems through LAN 916. Chipset 906 may include functionality for providing network connectivity through a network interface controller (NIC) 922, such as a gigabit Ethernet adapter. NIC 922 may be capable of connecting the computer 900 to other computing nodes over LAN 916. It should be appreciated that multiple NICs 922 may be present in computer 900, connecting the computer to other types of networks and remote computer systems.

Computer 900 may be connected to a mass storage device 928 that provides non-volatile storage for the computer. Mass storage device 928 may store system programs, application programs, other program modules, and data, which have been described in greater detail herein. Mass storage device 928 may be connected to computer 900 through a storage controller 924 connected to chipset 906. Mass storage device 928 may consist of one or more physical storage units. Storage controller 924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 900 may store data on mass storage device 928 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 928 is characterized as primary or secondary storage and the like.

For example, computer 900 may store information to mass storage device 928 by issuing instructions through storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 900 may further read information from mass storage device 928 by detecting the physical states or characteristics of one or more particular locations within the physical storage units.

In addition to mass storage device 928 described above, computer 900 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 900.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 928 may store an operating system utilized to control the operation of the computer 900. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 928 may store other system or application programs and data utilized by computer 900, such as management component 910 and/or the other software components described above.

Mass storage device 928 or other computer-readable storage media may also be encoded with computer-executable instructions, which, when loaded into computer 900, transforms the computer from a general-purpose computing system into a special-purpose computer capable of implementing the embodiments described herein. These computer-executable instructions transform computer 900 by specifying how CPUs 904 transition between states, as described above. Computer 900 may have access to computer-readable storage media storing computer-executable instructions, which, when executed by computer 900, may perform operating procedures described above in connection with FIGS. 1-6.

Computer 900 may also include an input/output controller 932 for receiving and processing input from a number of input devices, such as a keyboard, a mouse, a touchpad, a touch screen, an electronic stylus, or other type of input device. Similarly, input/output controller 932 may provide output to a display, such as a computer monitor, a flat-panel display, a digital projector, a printer, a plotter, or other type of output device. It will be appreciated that computer 900 may not include all of the components shown in FIG. 9, may include other components that are not explicitly shown in FIG. 9, or may utilize an architecture completely different than that shown in FIG. 9.

As described herein, a computing node may be a physical computing node, such as computer 900 of FIG. 9. A computing node may also be a virtual computing node, such as a virtual machine instance, or a session hosted by a physical computing node, where the computing node is configured to host one or more sessions concurrently.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog and details and specifications of the different types or sizes of resources supported and the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations, or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Accordingly, applicant has disclosed systems, methods, and computer readable media that are adapted for communicating between a mobile server, which has various services or functions available on it, and devices that request to access the various services or functions. The mobile server comprises a web server that receives input at a predefined port. The mobile server generates a WiFi network that is used to communicate data between the mobile server and the devices. Devices are provisioned to recognize the WiFi network and communicate requests for functionality to the web server at the predefined port. The mobile server provides access to the requested functionality via the WiFi network. The mobile server may communicate display output to one or more devices that have registered with the mobile server and indicated they are available to receive the output. Additionally, the mobile server may automatically assign particular devices to perform particular functions based upon the operating characteristics of the devices.

It will be appreciated that while illustrative embodiments have been disclosed, the scope of potential embodiments is not limited to those explicitly described. For example, while the concepts are described with reference to particular types of network connectivity and types of data being communicated with the mobile server, the envisioned embodiments extend to processing involving all consistent network connectivity and communicating of all types of suitable input and output data.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing server, comprising:
computing memory having stored therein computer instructions that, upon execution by one or more processors, at least cause the computing system to perform operations comprising:
providing a wireless local area network;
receiving via the wireless local area network at a web server accessible at a defined port a request from a device to identify services available at the computing server;
in response to receiving the request to identify services available, generating and transmitting via the wireless local area network to the device a list of services available on the computing server, the list of services comprising at least one pre-configured service accessible on a third party network via the computing server;
receiving, via the wireless local area network at the web server accessible at the defined port, a request from the device for access to a service in the list of services available on the computing server, the request specifying the at least one pre-configured service accessible on a third party network via the computing server;
providing the requested access to the at least one pre-configured service accessible on a third party network via the computing server;
receiving an indication the device is performing a first processing function;
receiving an indication a change has occurred in the available resources of the device; and
in response to the indication that a change has occurred in the available resources of the device, providing the device via the wireless local area network access to the first processing function and instructing the device to cease performing the first processing function on the device.

2. The computing server of claim 1,
wherein the generating and transmitting via the wireless local area network a list of services available on the computing server comprises generating and transmitting a list of services comprising one or more of the following: access to a component system comprised in the computing server; access to data comprised in the computing server; and access to a third party network via the computing server.

3. The computing server of claim 1,
wherein the generating and transmitting via the wireless local area network to the device a list of services available on the computing server comprises the generating and transmitting via the wireless local area network a list of services comprising access a third party network via the computing server;
wherein the receiving, via the wireless local area network, a request from the device for access to a service in the list of services comprises receiving a request to access the third party network via the computing server; and
wherein the providing the requested access to a service in the list of services comprises providing access to the third party network via the computing server.

4. The computing server of claim 3, wherein providing access to the third party network comprises providing access to one or more of wireless local area network and a 3 GPP network.

5. A computing system, comprising:
computing memory having stored therein computer instructions that, upon execution by one or more processors, at least cause the computing system to perform operations comprising:

27 providing a wireless local area network for accessing services via the computing system, the computing system adapted to provide to devices via the wireless local area network access to at least a first functionality;

receiving at the wireless local area network an indication a first device is in proximity and has first operating characteristics, the first device programmed to perform the first functionality;

receiving at the wireless local area network an indication a second device is in proximity and has second operating characteristics, the second device programmed to perform the first functionality;

determining based upon the first operating characteristics and the second operating characteristics to identify one of the first device and the second device to perform the first functionality;

communicating to the identified one of the first device and the second device to perform the first functionality;

receiving an indication the first operating characteristics have changed;

receiving an indication the second operating characteristics have changed;

determining based upon the changed first operating characteristics and the changed second operating characteristics to identify a different one of the first device and the second device to perform the first functionality; and communicating to the identified different one of the first device and the second device to perform the first functionality.

6. The computing system of claim 5,
wherein the first functionality is providing global positioning;
wherein receiving via the wireless local area network an indication that a change has occurred in first operating characteristics on the first device comprises receiving an indication remaining power is below a threshold.

7. The computing system of claim 5,
wherein the first functionality is providing access to a wireless network;
wherein receiving via the wireless local area network an indication that a change has occurred in first operating characteristics on the first device comprises receiving an indication an existing connection to wireless network is degraded.

8. The computing system of claim 5,
wherein the first functionality is storing data;
wherein receiving via the wireless local area network an indication that a change has occurred in first operating characteristics on the first device comprises receiving an indication available storage is below a threshold.

9. The computing system of claim 5,
further comprising communicating to the first device to cease performing the first functionality.

10. The computing system of claim 5,
wherein receiving via the wireless local area network an indication that a change has occurred in first operating characteristics on the first device comprises receiving an indication the first device has lost the ability to perform the first functionality.

11. The computing system of claim 5,
further comprising, in response to the indication that a change has occurred in first operating characteristics on the first device, querying a rule set to determine whether to provide to the first device via the wireless local area network access to the first functionality.

12. The computing system of claim 11, further comprising receiving profile information for the first device, the profile information specifying logic for switching from functionality provided by the first device to functionality provided by the computing system.

13. The computing system of claim 12, wherein the profile information specifying logic for switching from functionality provided by the first device to functionality provided by the computing system comprises information specifying logic for switching depending upon one or more of the operating characteristics of the first device.

14. The computing system of claim 5, further comprising:
receiving via the wireless local area network an indication that a second change has occurred in first operating characteristics at the first device; and
in response to the indication that a second change has occurred in first operating characteristics at the first device, terminating providing to the first device via the wireless local area network access to the first functionality and transmitting an indication to the first device to begin providing access to the first functionality.

15. A non-transitory computer-readable storage medium having stored thereon computer instructions that, upon execution by one or more processors, at least cause a mobile server to perform operations comprising:
providing a wireless local area network for accessing services via the mobile server, the mobile server adapted to provide to devices via the wireless local area network access to at least a first function;
receiving an indication a first device is in proximity of the mobile server and has first operating characteristics, the first device programmed to perform the first function;
receiving an indication a second device is in proximity to the mobile server and has second operating characteristics, the second device programmed to perform the first function;
determining based upon the first operating characteristics and the second operating characteristics to identify one of the first device and the second device to perform the first function;
communicating to the identified one of the first device and the second device to perform the first function;
receiving an indication the first operating characteristics have changed;
receiving an indication the second operating characteristics have changed;
determining based upon the changed first operating characteristics and the changed second operating characteristics to identify a different one of the first device and the second device to perform the first function; and
communicating to the identified different one of the first device and the second device to perform the first function.

16. The non-transitory computer-readable storage medium of claim 15,
wherein the first function is providing wireless access, and
wherein determining based upon the first operating characteristics and the second operating characteristics to identify one of the first device and the second device to perform the first function comprises the mobile server identifying the second device to perform the first function upon determining the first operating characteristics indicate the battery level of the first device is less than a predetermined value.

17. The non-transitory computer-readable storage medium of claim 15,
wherein the first function is wireless access, and
wherein determining based upon the first operating characteristics and the second operating characteristics to identify one of the first device and the second device to perform the first function comprises the mobile server identifying the second device to perform the first function upon determining the first operating characteristics indicate the quality of services provided by the first device is less than a predetermined value.

18. The non-transitory computer-readable storage medium of claim 15,
wherein the changed first operating characteristics and the changed second operating characteristics indicate the identified one of the first device and the second device cannot provide a desired quality of service.

19. The non-transitory computer-readable storage medium of claim 15, the operations further comprising:
receiving an indication the first operating characteristics have changed;
receiving an indication the second operating characteristics have changed;
determining based upon the changed first operating characteristics and the changed second operating characteristics to perform the first function in the mobile server; and
communicating to the identified one of the first device and the second device to cease performing the first function.

* * * * *